SWEEP RATE CONTROLLED FREQUENCY SWEPT OSCILLATOR

Filed Aug. 7, 1968

INVENTORS
HAROLD W. HUNT
CHARLES E. LITTLEJOHN
HARRY F. STRENGLEIN
BY Robert J. Haase
ATTORNEY United States Patent Office 3,528,033

Patented Sept. 8, 1970

3,528,033

SWEEP RATE CONTROLLED FREQUENCY SWEPT OSCILLATOR

Harold W. Hunt, Charles E. Littlejohn, and Harry F. Strenglein, Clearwater, Fla., assignors to Sperry Rand Corporation, Great Neck, N.Y., a corporation of Delaware Filed Aug. 7, 1968, Ser. No. 750,926
Int. Cl. H03b 23/00
U.S. Cl. 331—178 4 Claims

ABSTRACT OF THE DISCLOSURE

A feedback system for maintaining the sweep rate of a voltage controlled frequency swept oscillator at a selected value. The output of the swept oscillator is transmitted through two paths having different but fixed time delay characteristics and then heterodyned in a mixer to produce a beat frequency signal. The beat frequency varies directly with any changes in the slope of the oscillator frequency sweep. The beat frequency signal is applied to a frequency discriminator to produce a control voltage for controlling the sweep rate of the frequency swept oscillator.

BACKGROUND OF THE INVENTION

In the many applications for frequency swept signal sources, there are some having stringent requirements that the slope of the frequency sweep characteristics, i.e., the rate with which the signal frequency varies with time, be closely maintained at a predetermined value. For example, in certain test equipment, a precisely controlled frequency swept oscillator is required for measuring voltage standing wave ratios. Pulse compression radars also depend upon the maintenance of a predetermined frequency sweep slope to avoid undesired modulation of the transmitted signal and to achieve close matching to the pulse compression filter characteristics. Additionally, a variety of altimeter systems necessitate close adherence of the sweep slope of the frequency modulated transmitter in order to preserve accurate altitude calibration.

Prior art techniques for achieving a predetermined sweep rate for frequency swept oscillators range from simply relying upon careful design and the use of precision components to methods for stabilizing the center or average sweep frequency by utilizing standard cavity resonators or equivalent frequency reference structures. Such prior art frequency sweep control circuits are inadequate in instances where stringent control of the frequency sweep rate is mandatory.

SUMMARY OF THE INVENTION

The present invention achieves tight control over the frequency sweep rate of a frequency swept oscillator by transmitting the frequency swept signal through two propagation paths of known different delay characteristics and then heterodyning the differently delayed signals to provide a beat frequency signal. The frequency of the beat signal is dependent upon the sweep rate of the frequency swept oscillations as well as the differential delay between the two signal propagation paths. Inasmuch as the differential delay is fixed and predetermined, the frequency of the beat signal varies solely with the frequency sweep slope which is to be controlled. The beat signal is applied to a frequency determining circuit adjusted to produce an output voltage representing the sense and the magnitude of the deviation of the beat signal from a prescribed frequency. The prescribed frequency corresponds to the desired frequency sweep slope.

The control voltage provided by the frequency determining circuit optionally may be combined with a variable offset voltage before being applied to the sweep rate determining circuit of the frequency swept oscillator. Variation of the offset voltage allows for the adjustment of the frequency sweep slope between desired values.

DESCRIPTION OF THE PREFERRED EMBODIMENT

Figure 1:
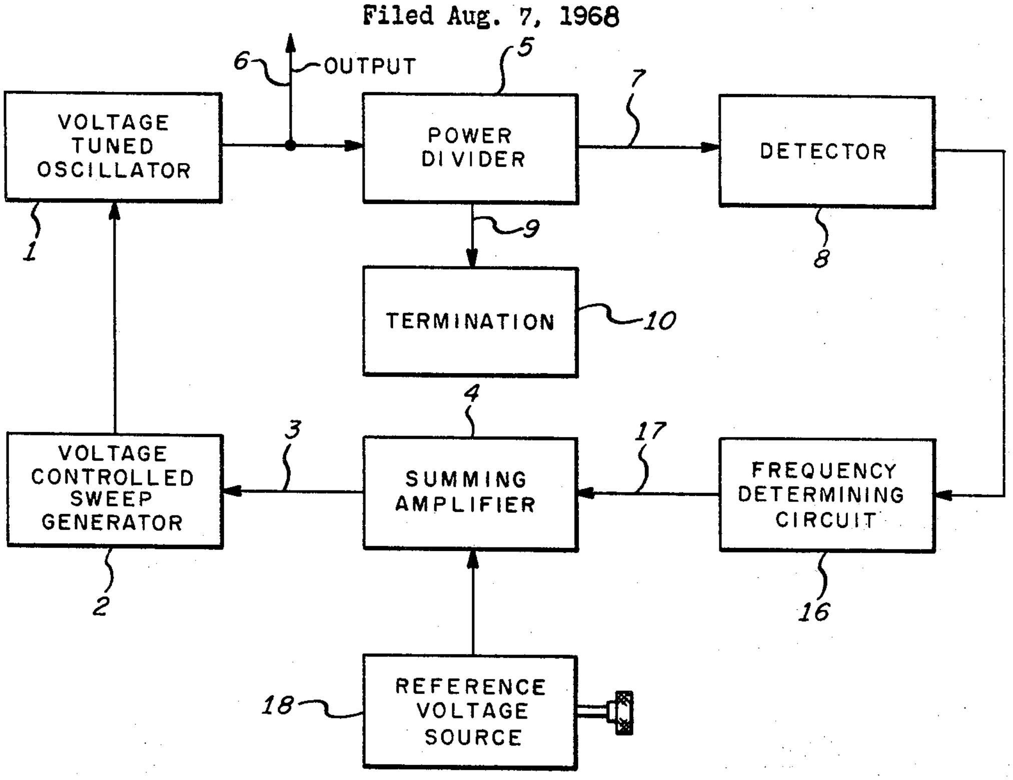
FIG. 1 is a simplified block diagram of a preferred embodiment of the invention.

Referring to FIG. 1, reference numeral 1 designates a conventional voltage-tuned oscillator which typically may be a magnetron, a travelling wave tube, a reflex klystron or backward wave oscillator in representative radar system applications. The frequency of oscillator 1 is controlled in accordance with the time-varying voltage provided by a conventional voltage controlled sweep generator 2. The voltage-time function of generator 2 is a sawtooth generated by the integration of a reference voltage or current which is made variable in order to control the slope of the sawtooth. The slope of the sawtooth is controlled by the magnitude of the voltage applied via line 3 at the output of summing amplifier 4. In response to the sawtooth voltage provided by generator 2, oscillator 1 produces a frequency swept oscillation, i.e., oscillations having frequencies which vary with respect to time in an increasing or in a decreasing manner.

The frequency swept oscillations from oscillator 1 are applied to power divider 5 and to output line 6. One output 7 of divider 5 is coupled to detector 8 and the other output 9 is coupled to a transmission line having a reflective termination 10. Energy reaching detector 8 after reflection from termination 10 will be delayed with respect to the energy which is directly coupled from output 7. Thus, the signal appearing at the input of detector 8 comprises the frequency swept signal of oscillator 1 and the same signal delayed via the path including reflecting termination 10. The two frequency swept signals have the same frequency sweep slope but different time phase and are offset in frequency from each other at any given time by an amount which depends upon said time phase and on the value of the frequency sweep slope.

Figure 2:
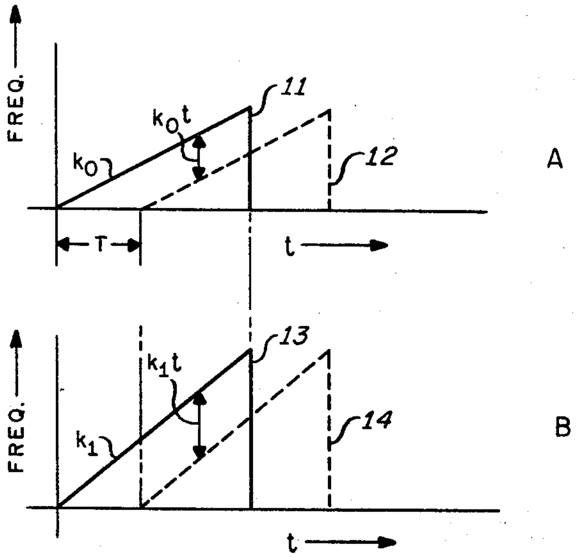
FIG. 2 is a series of frequency versus time plots exemplifying the operation of the preferred embodiment.

The frequency offset between the two signals at the input to detector 8 is depicted in the diagrams of FIG. 2. The frequency versus time plot 11 of diagram A of FIG. 2 represents the signal reaching detector 8 directly from output 7. The frequency versus time plot 12 represents the delayed signal reaching detector 8 after first being reflected from termination 10. Signal 12 is delayed with respect to signal 11 by an amount T representing the round-trip propagation delay associated with the transmission line and termination 10 at the output 9 of power divider 5. The frequency sweep slope of signals 11 and 12 is designated $k_0$. The difference in frequency between signals 11 and 12 at any given time is designated $k_0t$. In the event of an undesired variation in the frequency sweep rate of oscillator 1, signals 13 and 14 of diagram B of FIG. 2 appear at the input of detector 8 rather than signals 11 and 12. The frequency sweep slope of signals 13 and 14 is designated $k_1$ and the frequency difference between signals 13 and 14 at any given time is designated $k_1t$.

The non-linearity of detector 8 provides a beat frequency signal on line 15 representing the frequency difference $k_0t$ if signals 11 and 12 appear at the input to detector 8 and a beat frequency signal at frequency $k_1t$ in the event that signals 13 and 14 appear at the input to detector 8. The signal on line 15 is applied to a frequency determining circuit 16 such as a conventional frequency discriminating circuit. Frequency determining circuit 16 provides a null output on line 17 in response to an input signal at frequency $k_0t$. More generally, a voltage is provided on line 17 representing the magnitude and the sense of the deviation from $k_0$, if any, of the frequency sweep slope of the frequency swept oscillations generated by oscillator 1. For example, a voltage is produced on line 17 in response to frequency slope $k_1$ representing the magnitude and the sense of the difference between slopes $k_0$ and $k_1$.

The voltage on line 17 may be applied after suitable amplification directly to line 3 at the input to generator 2. Optionally, the voltage on line 17 may be combined with a variable reference voltage from source 18 in summing amplifier 4 (not shown) before being applied to line 3. Adjustment of the reference voltage from source 18 serves to offset the control effect of frequency determining circuit 16 so that the frequency sweep slope desired to be maintained in oscillator 1 may be varied in a controlled manner. The closed loop slope control system of FIG. 1 will maintain the slope value set by source 18. Source 18 may be omitted if there is no need to alter the frequency sweep slope desired to be maintained in oscillator 1. In some applications, it may be advantageous to employ a phase sensitive demodulator instead of a frequency discriminator to permit the use of a reference frequency source rather than a reference voltage source. Such substitutions would allow the beat frequency signal on line 15 to be phase locked to the known frequency of the reference frequency source which could be made variable for control purposes.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. Apparatus for controlling the sweep rate of a frequency swept oscillator comprising:

an oscillator having frequencies of oscillation determined by an applied sweep signal, a source of said sweep signal coupled to said oscillator, the slope of said sweep signal being determined by a control signal, a detector, means coupled to said oscillator for applying the oscillations thereof to said detector over two transmission paths of different delay characteristics, said detector producing a beat note signal having a frequency determined by the frequency sweep rate of said oscillator, and means for producing said control signal in response to deviation in frequency of said beat note signal from a desired value.

2. Apparatus as defined in claim 1 wherein said oscillator is voltage tunable and said source produces a sweep voltage.

3. Apparatus as defined in claim 1 wherein said means coupled to said oscillator comprises a power divider having an input and two outputs, said input being coupled to said oscillator, one of said outputs being connected to a reflectively terminated transmission line, and the other of said outputs being coupled to said detector.

4. Apparatus as defined in claim 1 wherein said means for producing said control signal includes:

a frequency discriminator, and a source of variable reference signal, the signal output of said discriminator and said reference signal being combined to produce said control signal.

References Cited

UNITED STATES PATENTS

| | | | |
|---|---|---|---|
| 3,010,073 | 11/1961 | Melas | 331—1 |
| 3,083,340 | 3/1963 | Nelson | 331—1 |
| 3,289,096 | 11/1966 | Longuemare et al. | 331—1 |

JOHN KOMINSKI, Primary Examiner

U.S. Cl. X.R.

331—1, 4, 9